US010399587B2

(12) United States Patent
Bacallao

(10) Patent No.: US 10,399,587 B2
(45) Date of Patent: Sep. 3, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 165 days.

(21) Appl. No.: 15/433,388

(22) Filed: Feb. 15, 2017

(65) Prior Publication Data

US 2017/0174242 A1 Jun. 22, 2017

Related U.S. Application Data

(63) Continuation-in-part of application No. 15/383,126, filed on Dec. 19, 2016, now Pat. No. 10,266,195, and
(Continued)

(51) Int. Cl.
*B62B 3/10* (2006.01)
*B62B 3/14* (2006.01)

(52) U.S. Cl.
CPC .............. *B62B 3/106* (2013.01); *B62B 3/146* (2013.01); *B62B 2202/26* (2013.01)

(58) Field of Classification Search
CPC ..... B62B 3/106; B62B 3/146; B62B 2202/26; B65B 67/1227; B65B 67/1266; B65B 67/1205
See application file for complete search history.

(56) References Cited

U.S. PATENT DOCUMENTS 259,932 A 6/1882 Sims
370,563 A 9/1887 Simmons
(Continued)

FOREIGN PATENT DOCUMENTS

AU 1142402 A1 4/2002
AU 2002364902 A1 5/2004
(Continued)

OTHER PUBLICATIONS

Search Report in GB Patent Application No. GB1713267.1, dated Dec. 22, 2017; 5 pages.
(Continued)

*Primary Examiner* — Corey N Skurdal
(74) *Attorney, Agent, or Firm* — Schmeiser, Olsen & Watts LLP; Karen E. Jachimowicz

(57) ABSTRACT

A shopping cart bagging station that couples to a shopping cart is described. The shopping cart bagging station includes a bag dispenser and a shopping cart coupler. The bag dispenser holds a plurality of shopping bags, and dispenses the shopping bags one at a time as products are placed in a shopping bag. The shopping cart coupler is coupled to the bag dispenser and couples the shopping cart bagging station to a shopping cart. The shopping cart bagging station is coupled to a shopping cart by coupling the shopping cart coupler to the bag dispenser such that a side of the shopping cart is clamped between the shopping cart coupler and the bag dispenser. The shopping cart bagging station can be mounted in various locations on a shopping cart, making it easy and convenient for a customer to carry and load a number of shopping bags as they shop.

15 Claims, 7 Drawing Sheets

Related U.S. Application Data a continuation-in-part of application No. 15/383,151, filed on Dec. 19, 2016, now Pat. No. 10,259,480, and a continuation-in-part of application No. 15/383,170, filed on Dec. 19, 2016, now Pat. No. 10,220,866.

(60) Provisional application No. 62/448,481, filed on Jan. 20, 2017, provisional application No. 62/402,475, filed on Sep. 30, 2016, provisional application No. 62/377,135, filed on Aug. 19, 2016, provisional application No. 62/377,143, filed on Aug. 19, 2016, provisional application No. 62/298,017, filed on Feb. 22, 2016, provisional application No. 62/298,011, filed on Feb. 22, 2016, provisional application No. 62/270,785, filed on Dec. 22, 2015, provisional application No. 62/270,827, filed on Dec. 22, 2015, provisional application No. 62/270,813, filed on Dec. 22, 2015.

(56) References Cited

U.S. PATENT DOCUMENTS

| | | | |
|---|---|---|---|
| 477,235 | A | 6/1892 | Timmerman |
| 562,229 | A | 6/1896 | Lenney |
| 635,100 | A | 10/1899 | Huebel |
| 765,388 | A | 7/1904 | Lanpher |
| 797,871 | A | 8/1905 | Smith |
| 809,568 | A | 1/1906 | Hulburt |
| 873,188 | A | 12/1907 | Thumann |
| 890,693 | A | 6/1908 | McCoy |
| 893,930 | A | 7/1908 | Lederman |
| 896,443 | A | 8/1908 | Dyett |
| 936,736 | A | 10/1909 | Porter et al. |
| 995,798 | A | 6/1911 | McCullough |
| 1,055,745 | A | 3/1913 | Harrison |
| 1,069,108 | A | 8/1913 | Buhl |
| 1,252,740 | A | 1/1918 | Thornblade |
| 1,284,579 | A | 11/1918 | Brown |
| 1,653,393 | A | 12/1927 | Cox |
| 1,662,140 | A | 3/1928 | Whitesides |
| 2,240,629 | A | 5/1941 | Smith |
| 2,305,863 | A | 12/1942 | Ginter |
| 2,498,446 | A | 2/1950 | Pawsat |
| 2,563,679 | A | 8/1951 | Hardy |
| 2,603,438 | A | 7/1952 | Adams |
| 2,682,956 | A | 7/1954 | Pike |
| 2,797,058 | A | 6/1957 | Packham |
| 2,998,955 | A | 9/1961 | Hertzog |
| 3,133,660 | A | 5/1964 | Roberts |
| 3,266,742 | A | 8/1966 | Pena |
| 3,313,504 | A | 4/1967 | Thorkild |
| 3,339,745 | A | 9/1967 | Sugerman |
| D209,279 | S | 11/1967 | Cohen |
| 3,438,644 | A | 4/1969 | Kaplan et al. |
| 3,475,067 | A | 10/1969 | Girard |
| 3,747,298 | A | 7/1973 | Lieberman |
| 3,930,696 | A | 1/1976 | Hight et al. |
| 3,943,859 | A | 3/1976 | Boone |
| 3,995,803 | A | 12/1976 | Uitz |
| 4,048,754 | A | 9/1977 | Laux |
| 4,082,939 | A | 4/1978 | Walters |
| 4,106,617 | A | 8/1978 | Boone |
| 4,269,336 | A | 5/1981 | Humlong |
| 4,305,558 | A | 12/1981 | Baker |
| 4,354,643 | A | 10/1982 | Kenner |
| 4,367,819 | A | 1/1983 | Lewis |
| 4,376,502 | A | 3/1983 | Cohen |
| 4,403,807 | A | 9/1983 | Wilkinson et al. |
| 4,456,125 | A | 6/1984 | Chap |
| 4,480,810 | A | 11/1984 | Hall |
| 4,576,388 | A | 3/1986 | Pope |
| 4,583,753 | A | 4/1986 | Economy |
| 4,595,153 | A | 6/1986 | Goetz |
| 4,655,409 | A | 4/1987 | Zima |
| 4,682,782 | A | 7/1987 | Mills |
| 4,702,402 | A | 10/1987 | Ferri |
| 4,728,070 | A | 3/1988 | Engelbrecht |
| 4,838,504 | A | 6/1989 | Bittenbinder |
| D302,062 | S | 7/1989 | Sable |
| 4,881,577 | A | 11/1989 | Stroh et al. |
| 4,881,706 | A | 11/1989 | Sedlik |
| 4,968,047 | A | 11/1990 | Ferris |
| 4,974,799 | A | 12/1990 | Palmer |
| 4,997,149 | A | 3/1991 | Koch |
| 4,998,647 | A | 3/1991 | Sharp |
| 4,998,694 | A | 3/1991 | Barteaux |
| 5,002,215 | A | 3/1991 | Gregoire |
| 5,005,791 | A | 4/1991 | Lanzen |
| 5,190,253 | A | 3/1993 | Sable |
| 5,362,077 | A | 11/1994 | Adamson |
| 5,366,123 | A | 11/1994 | Range |
| 5,385,318 | A | 1/1995 | Rizzuto |
| 5,390,443 | A | 2/1995 | Emalfarb et al. |
| 5,427,288 | A | 6/1995 | Trubee |
| 5,437,346 | A | 8/1995 | Dumont |
| 5,439,120 | A | 8/1995 | Brozak |
| 5,443,173 | A | 8/1995 | Emery et al. |
| D363,208 | S | 10/1995 | Seidel |
| 5,460,279 | A | 10/1995 | Emery et al. |
| 5,465,846 | A | 11/1995 | Blyth et al. |
| 5,503,297 | A | 4/1996 | Frankel |
| 5,513,823 | A | 5/1996 | Bresnahan |
| 5,531,366 | A | 7/1996 | Strom |
| 5,533,361 | A | 7/1996 | Halpem |
| 5,564,566 | A | 10/1996 | Lamb |
| 5,618,008 | A | 4/1997 | Dearwester et al. |
| 5,636,818 | A | 6/1997 | Edwards et al. |
| 5,704,497 | A | 1/1998 | Wyatt |
| 5,727,721 | A | 3/1998 | Guido et al. |
| D396,372 | S | 7/1998 | Goodman |
| 5,836,486 | A | 11/1998 | Ohsugi |
| 5,875,902 | A | 3/1999 | Emery et al. |
| D412,080 | S | 7/1999 | Emery et al. |
| 6,018,397 | A | 1/2000 | Cloutier et al. |
| 6,041,945 | A | 3/2000 | Faraj |
| 6,086,023 | A | 7/2000 | Kerr et al. |
| 6,109,462 | A | 8/2000 | Emalfarb et al. |
| 6,152,408 | A | 11/2000 | O'Grady |
| 6,155,521 | A | 12/2000 | O'hanlon |
| 6,170,679 | B1 | 1/2001 | Frye |
| 6,193,265 | B1 | 2/2001 | Yemini |
| 6,299,001 | B1 | 10/2001 | Frolov et al. |
| 6,305,572 | B1 | 10/2001 | Daniels et al. |
| D452,944 | S | 1/2002 | Schmidt |
| 6,341,704 | B1 | 1/2002 | Michel, Jr. |
| 6,364,266 | B1 | 4/2002 | Garvin |
| 6,390,422 | B2 | 5/2002 | Banko |
| 6,409,031 | B1 | 6/2002 | Wynne |
| D459,979 | S | 7/2002 | Goodman |
| 6,481,583 | B1 | 11/2002 | Black et al. |
| 6,543,638 | B2 | 4/2003 | Wile |
| 6,561,403 | B1 | 5/2003 | Kannankeril et al. |
| 6,601,759 | B2 | 8/2003 | Fife et al. |
| 6,606,411 | B1 | 8/2003 | Loui et al. |
| 6,607,229 | B1 | 8/2003 | McIntosh |
| 6,648,265 | B2 | 11/2003 | Goldberg |
| 6,655,537 | B1 | 12/2003 | Lang et al. |
| 6,685,075 | B1 | 2/2004 | Kannankeril |
| 6,726,145 | B1 | 4/2004 | Kraus |
| 6,726,156 | B1 | 4/2004 | Scola |
| D490,691 | S | 6/2004 | Buss et al. |
| 6,745,186 | B1 | 6/2004 | Testa et al. |
| 6,789,687 | B2 | 9/2004 | Cramer |
| 6,805,271 | B2 | 10/2004 | Holden |
| 6,810,149 | B1 | 10/2004 | Squilla et al. |
| 6,832,739 | B1 | 12/2004 | Kraus |
| 6,886,101 | B2 | 4/2005 | Glazer et al. |
| 6,937,989 | B2 | 8/2005 | Mcintyre et al. |
| 7,066,389 | B2 | 6/2006 | Dickover et al. |
| 7,077,612 | B1 | 7/2006 | Giggle, III et al. |
| 7,128,251 | B1 | 10/2006 | Galle |
| 7,172,092 | B2 | 2/2007 | Yang et al. |
| 7,177,820 | B2 | 2/2007 | Mcintyre et al. |

(56) References Cited

U.S. PATENT DOCUMENTS

| | | |
|---|---|---|
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0075015 A1 | 4/2004 | Cain et al. |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0219219 A1 | 9/2010 | Svetina |
| 2010/0264101 A1 | 10/2010 | Ma |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1 | 10/2016 | Hendrick et al. |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174243 A1 | 6/2017 | Bacallao et al. |
| 2017/0197650 A1 | 7/2017 | Whistler |
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |

(56) References Cited

FOREIGN PATENT DOCUMENTS

| | | |
|---|---|---|
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 | 6/2013 |

OTHER PUBLICATIONS

Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"Simplehuman Stainless Steel Grocery Bag Holder," ContainerStore.com, accessed on Jun. 14, 2017; 2 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.
Non-Final Office Action in U.S. Appl. No. 15/383,151, dated May 25, 2018; 13 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," Uline.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Non-Final Office Action in U.S. Appl. No. 15/383,170, dated Jul. 3, 2018; 10 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.
Restriction Requirement in U.S. Appl. No. 15/433,365 dated Dec. 31, 2018; 5 pages.
Non-Final Office Action in U.S. Appl. No. 15/433,365 dated Feb. 5, 2019; 8 pages.
Restriction Requirement in U.S. Appl. No. 15/676,143 dated Apr. 1, 2019; 6 pages.
Non-Final Office Action in U.S. Appl. No. 15/676,218 dated Feb. 22, 2019; 12 pages.
Non-Final Office Action in U.S. Appl. No. 16/238,705 dated Apr. 18, 2019; 7 pages.
Notice of Allowance in U.S. Appl. No. 15/433,365 dated Apr. 18, 2019; 5 pages.
Notice of Allowance in U.S. Appl. No. 15/383,126 dated Jan. 15, 2019; 5 pages.
Restriction Requirement in U.S. Appl. No. 16/102,954 dated Jul. 3, 2019; 7 pages.

SHOPPING CART BAGGING STATION AND METHOD OF FORMING THE SAME

CROSS REFERENCE TO RELATED APPLICATIONS

This application is a continuation-in-part of U.S. non-provisional application Ser. No. 15/383,126, filed Dec. 19, 2016 to Applicant Wal-Mart Stores Inc., and entitled "Shopping Cart Bagging Station and Method of Forming the Same"; and this application is a continuation-in-part of U.S. non-provisional application Ser. No. 15/383,151, filed Dec. 19, 2016 to Applicant Wal-Mart Stores Inc., and entitled "Shopping Cart Bagging Station and Method of Forming the Same"; and this application is a continuation-in-part of U.S. non-provisional application Ser. No. 15/383,170, filed Dec. 19, 2016 to Applicant Wal-Mart Stores Inc., and entitled "Shopping Cart Bagging Station and Method of Forming the Same"; and this application claims priority to U.S. provisional application Ser. No. 62/298,011, filed Feb. 22, 2016 to Applicant Wal-Mart Stores Inc., and entitled "Shopping Cart Bagging Station and Method of Forming the Same", U.S. provisional application Ser. No. 62/298,017, filed Feb. 22, 2016 to Applicant Wal-Mart Stores Inc., and entitled "Shopping Cart Bagging Station and Method of Forming the Same", U.S. provisional application Ser. No. 62/377,135, filed Aug. 19, 2016 to Applicant Wal-Mart Stores Inc., and entitled "Shopping Cart Bagging Station and Method of Forming the Same", U.S. provisional patent application Ser. No. 62/377,143, filed Aug. 19, 2016 to Applicant Wal-Mart Stores Inc., and entitled "Shopping Cart Bagging Station and Method of Forming the Same", U.S. provisional patent application Ser. No. 62/402,475, filed Sep. 30, 2016, to Applicant Wal-Mart Stores Inc., and entitled "Shopping Cart Bagging Station and Method of Forming the Same" and U.S. provisional patent application Ser. No. 62/448,481, filed Jan. 20, 2017 to Applicant Wal-Mart Stores Inc., and entitled "Shopping Cart Bagging Station and Method of Forming the Same", each of which is incorporated herein by reference in its entirety.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are able to pay for and bag their products as they shop, and these actions can occur at locations other than at checkout stations. There is a need for bagging stations at locations in retail stores besides the checkout station.

Accordingly, what is needed is a bagging station that can be mounted in a shopping cart, so that customers can bag their purchases as they shop.

DETAILED DESCRIPTION OF EMBODIMENTS OF THE INVENTION

Figure 1:
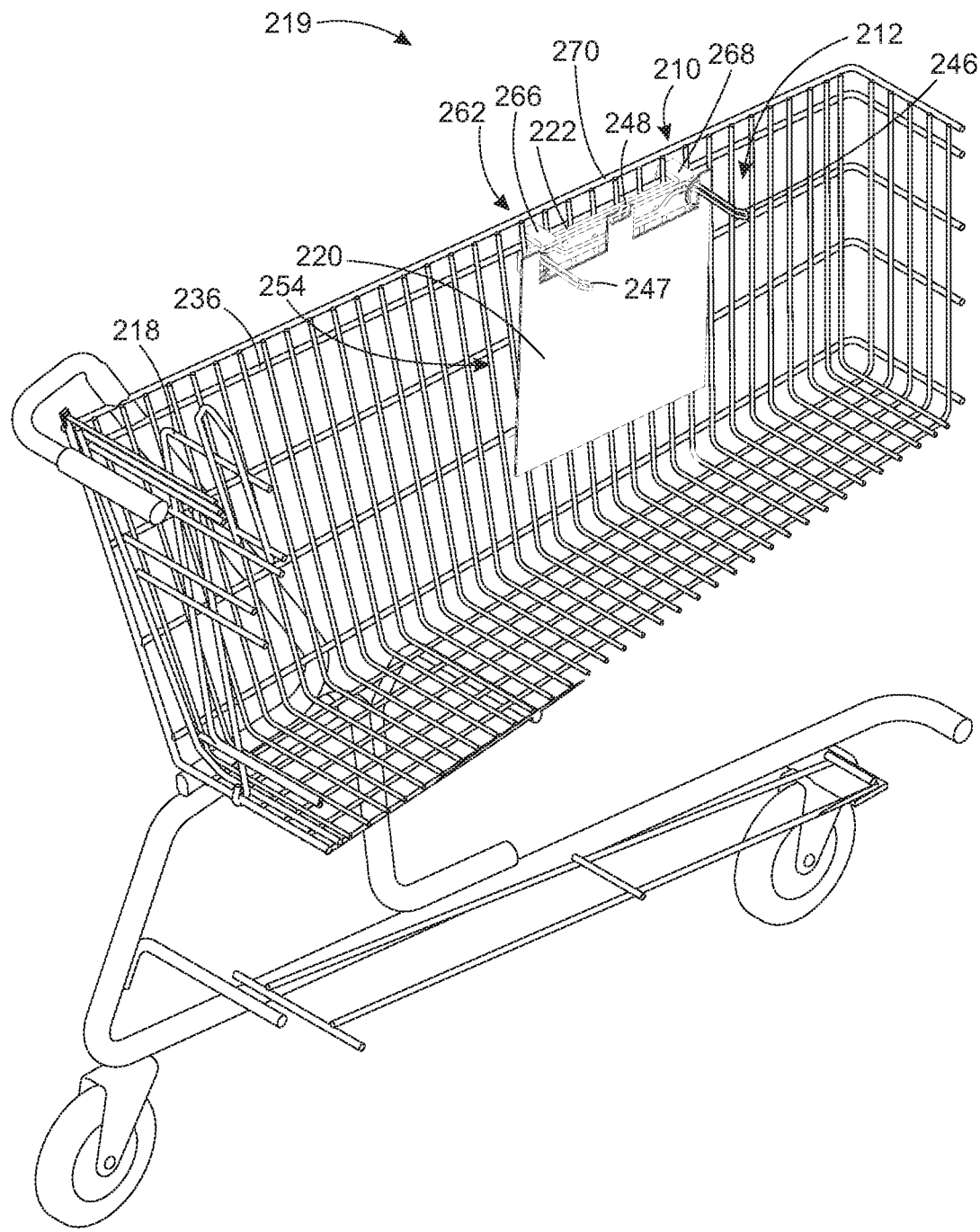
FIG. 1 shows a perspective view of a shopping cart with a shopping cart bagging station coupled to a side of the shopping cart.

Disclosed herein are embodiments of an invention related to retail store fixtures and, more specifically, to a bagging station that couples to a shopping cart. Described is a shopping cart system that includes a shopping cart and a shopping cart bagging station. The disclosed shopping cart system with shopping cart bagging station can be used by customers to bag their purchases as they shop. The disclosed shopping cart bagging station includes a bag dispenser and a shopping cart coupler. The bag dispenser holds a plurality of shopping bags, and dispenses the shopping bags one at a time as products are placed in a shopping bag. The shopping cart coupler is coupled to the bag dispenser and couples the shopping cart bagging station to a shopping cart. The shopping cart coupler includes a back plate, and a first and a second L bracket coupled to the back plate. In some embodiments, the bag dispenser includes a support bar, a first and a second handler holder arm, and a bag holder hook. The bag holder hook is coupled to the support bar, where the bag holder hook holds the plurality of shopping bags. The first and the second handle holder arm are coupled to the support bar. Each of the first and the second handle holder arms hold a handle of a shopping bag such that the shopping bag is held open and items can be placed in the shopping bag. The shopping cart coupler can include bolts which couple the shopping cart coupler to the bag dispenser. The shopping cart bagging station is coupled to a shopping cart by coupling the shopping cart coupler to the bag dispenser with a side of the shopping cart clamped (held, secured, fastened, anchored) between the shopping cart coupler and the bag dispenser. The shopping cart bagging station can be mounted in various locations on a shopping cart, making it easy and convenient for a customer to carry and load a plurality of shopping bags as they shop. The shopping cart system includes the shopping cart and the shopping cart bagging station. The shopping cart bagging station is a fixed shopping cart bagging station that, once mounted to the shopping cart, will often stay with the shopping cart indefinitely. The shopping cart bagging station can be coupled to the shopping cart with bolts, for example, and so is not designed to be removed and re-attached frequently. The disclosed shopping cart system with the shopping cart and the shopping cart bagging station provides a means for a customer to load purchases into bags as they shop, instead of having to bag their purchases at a checkout station.

Disclosed herein is a shopping cart bagging station that includes a means to dispense shopping bags, and a means to couple the means to dispense shopping bags to a shopping cart. In some embodiments, the means to couple the means to dispense shopping bags to the shopping cart includes a means to capture a side of the shopping cart between the means to dispense shopping bags and the means to couple the means to dispense shopping bags to a shopping cart. The means to dispense shopping bags and the means to couple the means to dispense shopping bags to a shopping cart can take many different forms, some examples of which are shown and described in this document. The examples shown and described are not meant to be limiting, and many other variations are possible in light of the teachings in this document.

Figure 2:
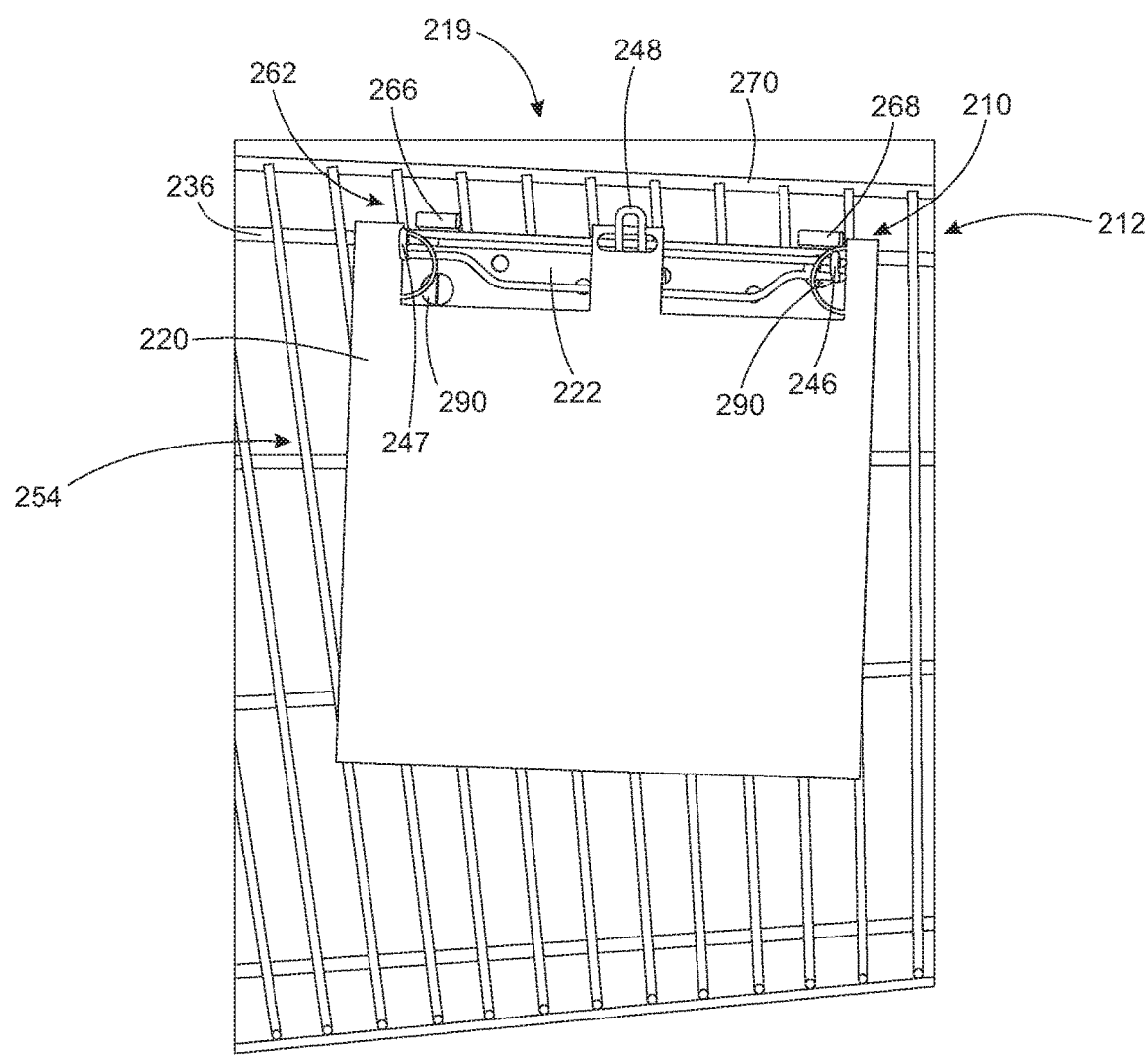
FIG. 2 shows a close up front perspective view of the shopping cart bagging station of FIG. 1 coupled to the shopping cart.
Figure 3:
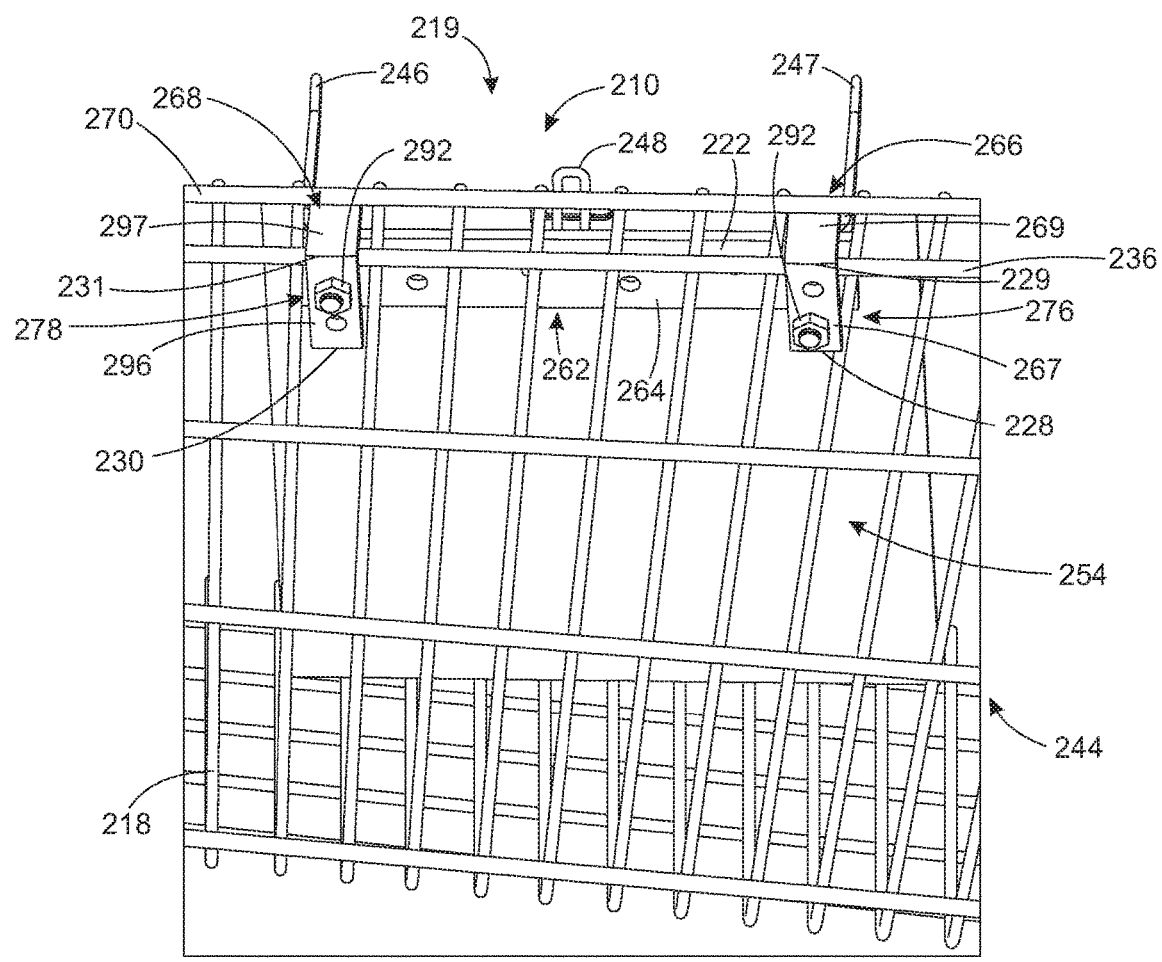
FIG. 3 shows a rear perspective view of the shopping cart bagging station of FIG. 1 coupled to the shopping cart.
Figure 4:
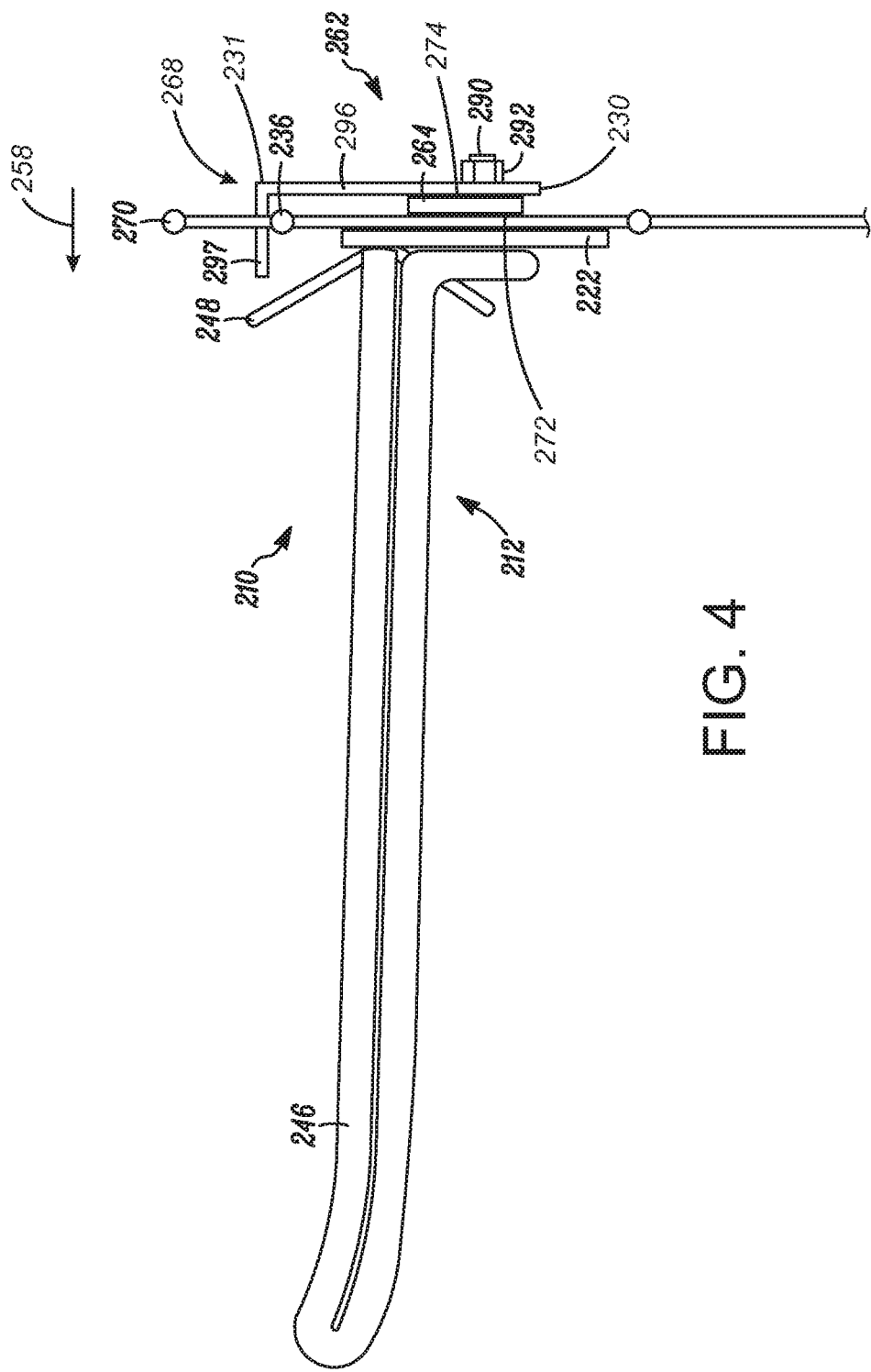
FIG. 4 is a side view of the shopping cart bagging station of FIG. 1 coupled to a shopping cart.
Figure 5:
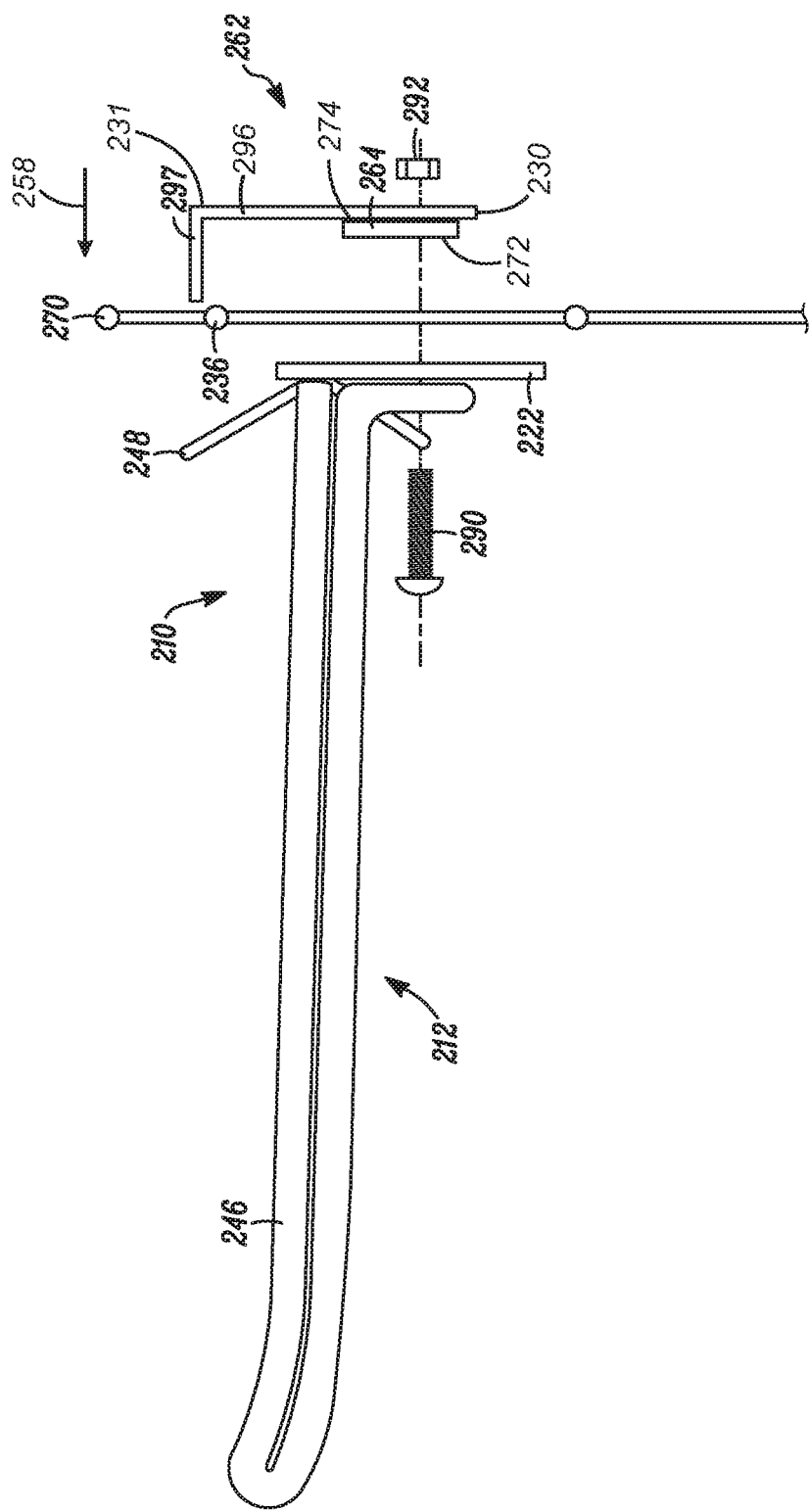
FIG. 5 is an exploded side view of the shopping cart bagging station of FIG. 1 coupled to the shopping cart.

FIG. 1 through FIG. 3 show an embodiment of a shopping cart system 219. FIG. 1 shows a perspective view of shopping cart system 219. Shopping cart system 219 includes a shopping cart 218 and a shopping cart bagging station 210 coupled to shopping cart 218. FIG. 2 shows a close up front perspective view of shopping cart bagging station 210 coupled to a side 270 of shopping cart 218. A plurality of shopping bags 254 is held by shopping cart bagging station 210. FIG. 3 shows a close up rear perspective view of shopping cart bagging station 210 coupled to side 270 of shopping cart 218. FIG. 4 shows a side view of shopping cart bagging station 210 coupled to side 270. FIG. 5 shows an exploded side view of shopping cart bagging station 210 coupled to side 270 of shopping cart 218.

Shopping cart system 219 includes shopping cart 218 and shopping cart bagging station 210, as shown in FIG. 1 through FIG. 3. Shopping cart bagging station 210 is coupled to a side 270 of shopping cart 218, but this is not meant to be limiting. Shopping cart bagging station 210 can be coupled to a front, back, sides, interior, or exterior of shopping cart 218. Shopping cart bagging station 210 is coupled to shopping cart 218 with a side 270 of shopping cart 218 held by shopping cart bagging station 210. Shopping cart bagging station 210 is fixedly coupled to shopping cart 218 in this embodiment. Fixedly coupled, in this embodiment, means that it is possible to remove shopping cart bagging station 210 from shopping cart 218, but it is not necessarily easy or quick to remove shopping cart bagging station 210 from shopping cart 218, so removal is not meant to be performed often. Once shopping cart bagging station 210 is coupled to shopping cart 218, it is meant to stay there indefinitely and not be removed by customers or employees until maintenance or repair is needed. Shopping cart system 219 includes both shopping cart 218 and shopping cart bagging station 210, and these are meant to be kept together as a system and used by customers at the retail store.

Shopping cart bagging station 210 includes a bag dispenser 212, and a shopping cart coupler 262, as shown in the figures. Bag dispenser 212 dispenses shopping bags, and shopping cart coupler 262 couples bag dispenser 212 to a shopping cart. Shopping cart bagging station 210 is coupled to shopping cart 218 with side 270 of shopping cart 218 clamped (held or captured) between bag dispenser 212 and shopping cart coupler 262 of shopping cart bagging station 210.

Shopping cart bagging station 210 includes bag dispenser 212, as shown in FIG. 1 through FIG. 5. In the embodiment shown, bag dispenser 212 is the means to dispense shopping bags, but this is not meant to be limiting. The means to dispense shopping bags can take many other forms.

Bag dispenser 212 holds and dispenses at least one shopping bag. In the embodiment shown in the figures, bag dispenser 212 holds a plurality of shopping bags 254, as shown in FIG. 1. Bag dispenser 212 includes a support bar 222, a pair of handle holder arms 246 and 247 coupled to, and extending from, support bar 222, and a bag holder hook 248 coupled to support bar 222. Bag holder hook 248 holds plurality of shopping bags 254, as shown in FIG. 1 through FIG. 3. Each handle holder arm 246 and 247 holds a handle of one or more bag of plurality of shopping bags 254. When a user wishes to fill a first one of plurality of shopping bags 254, for example a bag 220 as shown in FIG. 2, bag 220 is pulled away from support bar 222, with the shopping bag handles sliding along bag holder arms 246 and 247 until shopping bag 220 is open and ready to receive items. Bag holder arms 246 and 247 support bag 220 and the items placed in bag 220. Once the user is done filling bag 220, bag 220 is removed from shopping cart bagging station 210 and the process is repeated with a next one of plurality of shopping bags 254.

Figure 6:
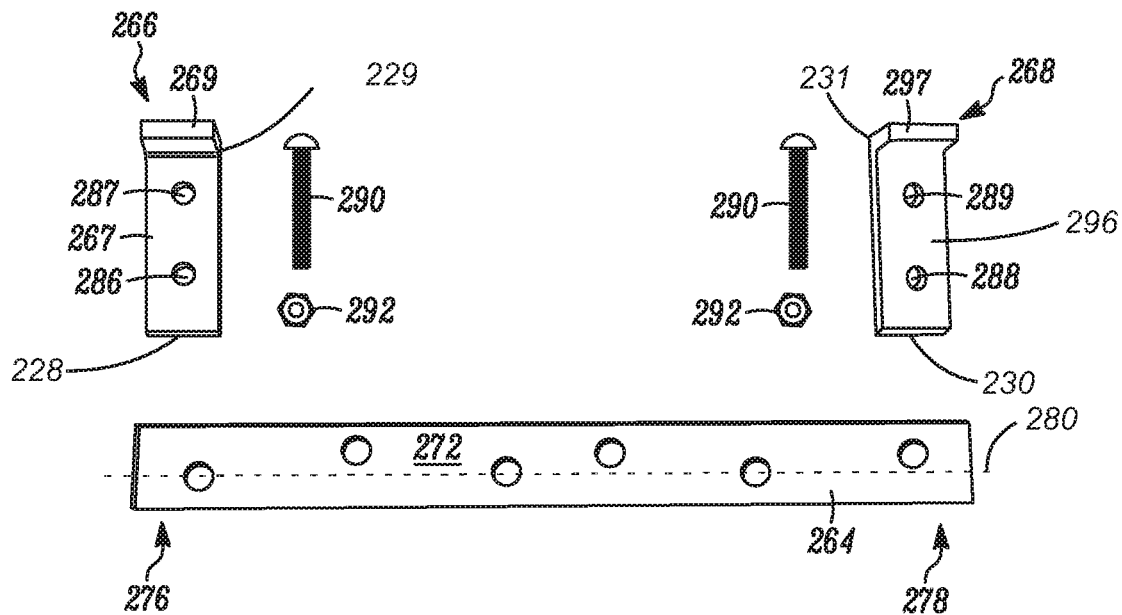
FIG. 6 shows a front view of the components of a shopping cart coupler of the shopping cart bagging station of FIG. 1.
Figure 7:
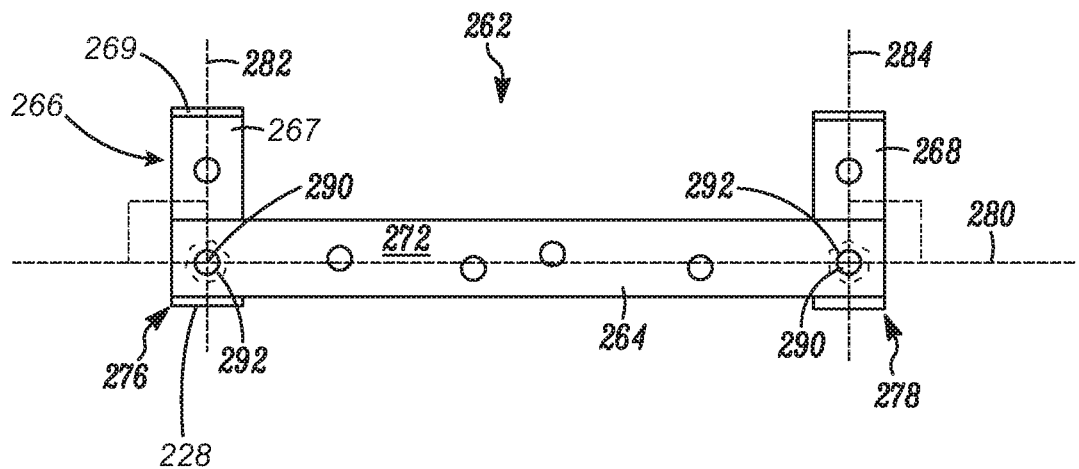
FIG. 7 shows a front view of a shopping cart coupler of the shopping cart bagging station of FIG. 1.

Shopping cart bagging station 210 also includes shopping cart coupler 262, as shown in FIG. 1 through FIG. 7. Shopping cart coupler 262 is, in this embodiment, the means to couple the means to dispense shopping bags to a shopping cart, but this is not meant to be limiting. FIG. 6 shows a front view of the elements of shopping cart coupler 262. FIG. 7 shows a front view of shopping cart coupler 262 assembled, without bag dispenser 212 in the figure, so the details of shopping cart coupler 262 can be easily viewed.

Shopping cart coupler 262 is shown in FIG. 1 through FIG. 5 coupling bag dispenser 212 to shopping cart 218. Shopping cart coupler 262 is fixedly mounted to bag dispenser 212 with a coupling means, which is bolts 290 (FIG. 2, FIG. 4 and FIG. 5) in this embodiment. Shopping cart coupler 262 is coupled to bag dispenser 212 with a side 270 of shopping cart 218 between shopping cart coupler 262 and bag dispenser 212, as can be seen best in FIG. 1, FIG. 4 and FIG. 5. In this embodiment, bolts 290 of shopping cart coupler 262 are a means to clamp, hold, or secure side 270 of shopping cart 218 between the means to dispense shopping bags (bag dispenser 212) and the means to couple the means to dispense shopping bags to a shopping cart (shopping cart coupler 262), but this is not meant to be limiting.

FIG. 4 and FIG. 5 show a side view (FIG. 4) and an exploded side view (FIG. 5) of shopping cart bagging station 210 including bag dispenser 212 and shopping cart coupler 262, showing how side 270 of shopping cart 218 is clamped or held between bag dispenser 212 and shopping cart coupler 262 in response to shopping cart coupler 262 being coupled to bag dispenser 212.

Shopping cart coupler 262 includes a back plate 264, a first L bracket 266, and a second L brackets 268 (best seen in FIG. 6 and FIG. 7). Each of first and second L bracket 266 and 268 is coupled to back plate 264 and bag dispenser 212 with a mechanical coupler, which in this embodiment is bolts 290 and nuts 292 as shown in the figures.

Back plate 264 is an elongate rigid bar having a front surface 272 (FIG. 6 and FIG. 7) and a back surface 274 (FIG. 3). Back plate 264 has a first end 276 and a second end 278 opposing back plate first end 276. Back plate 264 has a back plate longitudinal axis 280 (FIG. 6 and FIG. 7) that extends longitudinally from first end 276 to second end 278 of back plate 264.

First L bracket 266 is an "L"-shaped rigid member, with a first stem 267 and a first leg 269, as shown in FIG. 6. First stem 267 has a first stem first end 228 and a first stem second end 229 opposing first stem first end 228. First stem 267 has a first L bracket longitudinal axis 282 extending from first stem first end 228 to first stem second end 229. First leg 269 is coupled to, and extends from, first stem second end 229. First leg 269 extends from first stem 267 in a direction perpendicular to first leg 269 to form the "L" shape. First L bracket 266 also has a first hole 286 and a second hole 287. First and second hole 286 and 287 are used to receive couplers such as, but not limited to, bolt 290, for coupling L bracket 266 to support bar 264 and bag dispenser 212.

Second L bracket 268 is an "L"-shaped rigid member, with a second stem 296 and a second leg 297, as shown in FIG. 5 and FIG. 6. Second stem 296 has a second stem first end 230 and a second stem second end 231 opposing second stem first end 230. Second stem 296 has a second L bracket longitudinal axis 284 extending from second stem first end 230 to second stem second end 231. Second leg 297 is coupled to, and extends from, second stem second end 231. Second leg 297 extends from second stem 296 in a direction perpendicular to second leg 297 to form the "L" shape. Second L bracket 268 has a third hole 288 and a fourth hole 289. Third and fourth hole 288 and 289 are used to receive couplers such as, but not limited to, bolt 290, for coupling L bracket 268 to support bar 264 and bag dispenser 212.

First L bracket 266 is coupled to back plate rear surface 274 at back plate first end 276, as shown in FIG. 3 and FIG. 7. First stem 267 is coupled to back plate rear surface 274 at back plate first end 276. First stem 267 is coupled to back plate 264 such that first leg 269 points towards front surface 272, shopping cart 218, and bag dispenser 212, as shown in FIG. 3. In this embodiment, first L bracket 266 is coupled to back plate 264 in a position such that first L bracket longitudinal axis 282 is perpendicular to back plate long axis 280, as shown in FIG. 7. First L bracket 266 has two holes 286 and 287 (FIG. 6) for extending a bolt 290 through when coupling first L bracket 266 to support bar 264 and bag dispenser 212. Having two holes 286 and 287 provides for adjustability of shopping cart bagging station 210 by having a choice of mounting holes.

Second L bracket 268 is coupled to back plate rear surface 274 at back plate second end 278, as shown in FIG. 3, FIG. 4, FIG. 5, and FIG. 7. Second stem 296 is coupled to rear surface 274 at back plate second end 278. Second stem 296 is coupled to rear surface 274 of back plate 264 such that second leg 297 points towards front surface 272, shopping cart 218, and bag dispenser 212. In this embodiment, second L bracket 268 is coupled to back plate 264 in a position such that second L bracket longitudinal axis 284 is perpendicular to back plate long axis 280, as shown in FIG. 7. Second L bracket 268 has two holes 288 and 289 (FIG. 6) for extending a bolt 290 through when coupling second L bracket 268 to support bar 264 and bag dispenser 212. Having two holes 288 and 289 provides for adjustability of shopping cart bagging station 210 by having a choice of mounting holes.

First and second L brackets 266 and 268, and bolts 290, secure shopping cart bagging station 212 to side 270 of shopping cart 218, as can best be seen in FIG. 4 and FIG. 5. Shopping cart coupler 262 is coupled to shopping cart 218 and bag dispenser 212 by bolting first L bracket 266, second L bracket 268, and back plate 264 to bag dispenser 212, clamping (holding, capturing, fastening, securing) side 270 of shopping cart 218 in between bag dispenser 212 and shopping cart coupler 262. In this embodiment, a bolt 290 is extended through hole 286 of first L bracket 266, and then through back plate 264, through side 270 of shopping cart 218 and through support bar 222 of bag dispenser 212. Another bolt 290 is extended through hole 288 of second L bracket 268, through back plate 264, through side 270 of shopping cart 218, and through support bar 222 of bag dispenser 212, as can best be seen in FIG. 4 and FIG. 5. Bolts 290 hold side 270 of shopping cart 218 between bag dispenser 212 and shopping cart coupler 262.

First and second L brackets 266 and 268 couple bag dispenser 212 to side 270 of shopping cart 218 in a number of ways. First and second L brackets 266 and 268 clamp (capture, hold, secure) side 270 between shopping cart coupler 262 and bag dispenser 212. And, first and second L brackets hang from a rod 236 of shopping cart 218, further securing shopping cart bagging station 210 to shopping cart 218. Rod 236 is one of a plurality of shopping cart rods 244 of shopping cart 218. For example, FIG. 3 and FIG. 5 show how leg 297 of L bracket 268 extends over rod 236 of shopping cart 218, hanging shopping cart bagging station 210 from rod 236 once shopping cart coupler 262 is coupled to bag dispenser 212, as shown in FIG. 3, FIG. 4, and FIG. 5. First leg 269 and second leg 297 extend through side 270 of shopping cart 218, and first and second L bracket 266 and 268 hang from rod 236 of shopping cart 218, as best seen in FIG. 3, FIG. 4, and FIG. 5. First leg 269 and second leg 297 hang from rod 236 after bag dispenser 212 is fixedly mounted to back plate 264 with side 270 held between bag dispenser 212 and back plate 264. It is to be understood that first and second leg 269 and 297 can hang from many different rods of plurality of rods 244, depending on where it is desired to hang shopping cart bagging station on shopping cart 218.

Multiple holes in back plate 264 and first and second L bracket 266 and 268 provide adjustability and options for mounting shopping cart bagging station 210 to different positions in shopping cart 218. It is to be understood that couplers other than bolts are used in some embodiments of shopping cart bagging station 210. In some embodiments, L brackets 266 and 268 have different sizes and shapes to match different sizes and shapes of shopping carts.

With shopping cart coupler 262 fixedly coupled to bag dispenser 212 with side 270 clamped, or held, in between, shopping cart bagging station 210 is coupled to shopping cart 218 and can be used by a customer to dispense bags as needed while the customer shops. Shopping cart bagging station 210 can be coupled to many positions within shopping cart 218. FIG. 2 and FIG. 3 show shopping cart bagging station 210 coupled to a side 270 of shopping cart 218, but this is not mean to be limiting. Shopping cart bagging station 210 can be coupled to any side, front, or rear of shopping cart 218. Shopping cart bagging station 210 can be coupled to the interior or exterior of shopping cart 218. Shopping cart bagging station 210 can be coupled to the front, sides, rear, edges, or bottom of shopping cart 218. In some embodiments, the shopping cart will take a form other than shopping cart 218, and the means to couple bagging station 210 to the shopping cart will take another form consistent with the form of the shopping cart.

Figure 8:
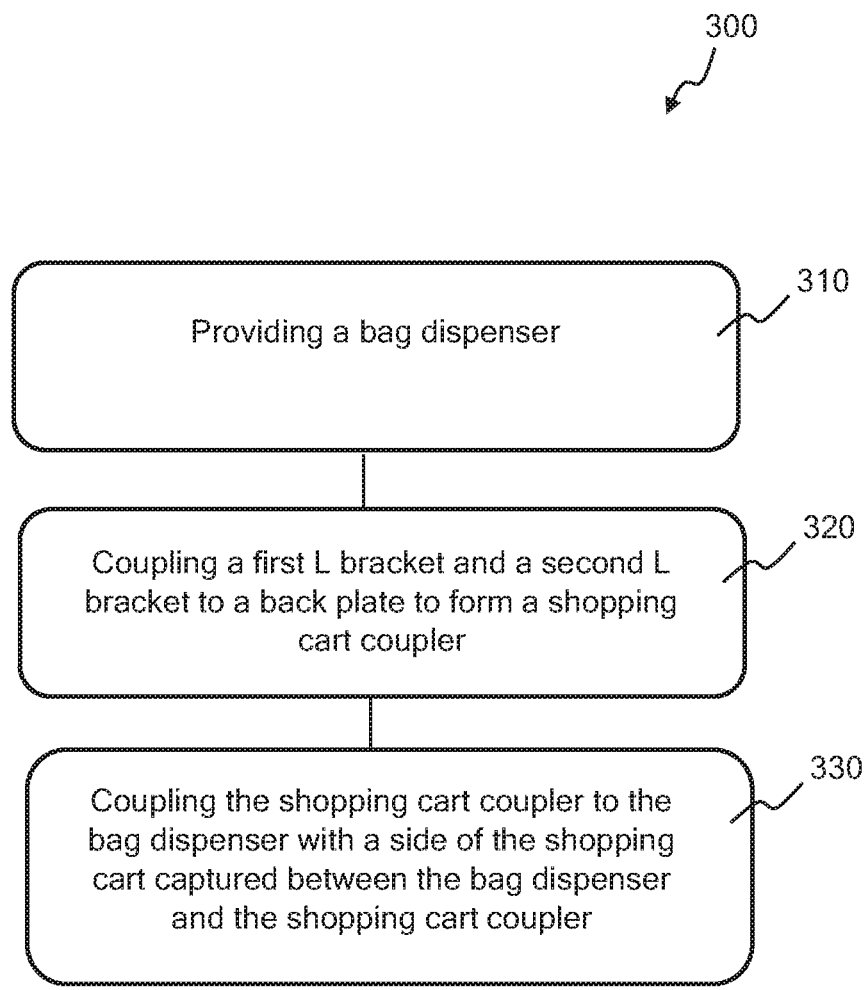
FIG. 8 illustrates a method of forming a shopping cart system.

FIG. 8 illustrates a method 300 of forming a shopping cart bagging station. Method 300 includes an act 310 of providing a bag dispenser. The bag dispenser can be any type of bag dispenser that holds and dispenses shopping bags.

Method 300 includes an act 320 of coupling a first L bracket and a second L bracket to a back plate to form a shopping cart coupler. In some embodiments, the back plate is an elongate rigid bar having a back plate first end, a back plate second end opposing the back plate first end, a front surface, a rear surface, and a back plate longitudinal axis. In some embodiments, the back plate longitudinal axis extends longitudinally from the back plate first end to the back plate second end.

In some embodiments, the first L bracket includes a first stem with a first stem first end and a first stem second end opposing the first stem first end. In some embodiments, the first L bracket includes a first L bracket longitudinal axis, where the first L bracket longitudinal axis extends longitudinally from the first stem first end to the first stem second end. In some embodiments, the first L bracket includes a first leg coupled to the first stem, wherein the first leg extends perpendicular to the first stem.

In some embodiments the second L bracket includes a second stem with a second stem first end and a second stem second end opposing the second stem first end. In some embodiments, the second L bracket includes a second L bracket longitudinal axis, where the second L bracket longitudinal axis extends longitudinally from the second stem first end to the second stem second end. In some embodiments the second L bracket includes a second leg coupled to the second stem, wherein the second leg extends perpendicular to the second stem.

In some embodiments, act 320 of coupling the first and the second L bracket to the back plate to form the shopping cart coupler includes coupling the first L bracket to the rear surface at the back plate first end. In some embodiments, act 320 of coupling the first and the second L bracket to the back plate to form the shopping cart coupler includes coupling the second L bracket to the rear surface at the back plate second end.

In some embodiments, coupling the first L bracket to the rear surface at the back plate first end includes coupling the first stem to the rear surface, wherein the first leg extends in a direction towards the front surface. In some embodiments, coupling the first L bracket to the rear surface at the back plate first end comprises coupling the first stem to the rear surface such that the first L bracket longitudinal axis is perpendicular to the back plate longitudinal axis.

In some embodiment, coupling the second L bracket to the rear surface at the back plate second end comprises coupling the second stem to the rear surface, wherein the second leg extends in a direction towards the front surface. In some embodiments, coupling the second L bracket to the rear surface at the back plate second end comprises coupling the second stem to the rear surface such that the second L bracket longitudinal axis is perpendicular to the back plate longitudinal axis.

Method 300 also includes an act 330 of coupling the shopping cart coupler to the bag dispenser with a side of the shopping cart clamped, or held, between the bag dispenser and the shopping cart coupler. In some embodiments, the coupling is fixedly coupling using bolts. In some embodiments, coupling the shopping cart coupler to the bag dispenser includes fixedly mounting the bag dispenser to the back plate with the side of the shopping cart clamped, held, or secured between the bag dispenser and the back plate. In some embodiments, the first leg and the second leg hang from a rod of the shopping cart after fixedly mounting the bag dispenser to the back plate with the side of the shopping cart held between the bag dispenser and the back plate.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart system comprising:
a shopping cart; and
a shopping cart bagging station coupled to a side of the shopping cart, wherein the shopping cart bagging station comprises:
   a bag dispenser, wherein the bag dispenser holds at least one shopping bag; and
   a shopping cart coupler that couples the bag dispenser to the shopping cart, wherein the shopping cart coupler comprises:
     a back plate;
     a first L bracket coupled to the back plate; and
     a second L bracket coupled to the back plate;
wherein the back plate is coupled to the bag dispenser with the side of the shopping cart clamped between the bag dispenser and the back plate.

2. The shopping cart system of claim 1, wherein:
a first L bracket stem of the first L bracket having a first L bracket longitudinal axis is coupled to a rear surface of the back plate at a back plate first end;
the first L bracket longitudinal axis is perpendicular to a back plate longitudinal axis of the back plate;
a first leg extends perpendicularly from the first L bracket stem in a direction towards the shopping cart;
a second L bracket stem of the second L bracket having a second L bracket longitudinal axis is coupled to the rear surface of the back plate at a back plate second end;
the second L bracket longitudinal axis is perpendicular to the back plate longitudinal axis; and
a second leg extends perpendicularly from the second L bracket stem in a direction towards the shopping cart.

3. The shopping cart system of claim 2, wherein the first leg and the second leg extend through the side of the shopping cart, and wherein the first and the second L bracket hang from a rod of the shopping cart.

4. A shopping cart bagging station comprising:
a bag dispenser, wherein the bag dispenser holds at least one shopping bag; and
a shopping cart coupler that couples the bag dispenser to a shopping cart, wherein the shopping cart coupler comprises:
   a back plate comprising a front surface, a rear surface, a back plate longitudinal axis, a back plate first end and a back plate second end; and
   a first L bracket coupled to the rear surface at the back plate first end, wherein the first L bracket comprises:
     a first L bracket stem having a first L bracket longitudinal axis, wherein the first L bracket stem is coupled to the back plate first end, and wherein the first L bracket longitudinal axis is perpendicular to the back plate longitudinal axis;
     and a first leg coupled to the first L bracket stem, wherein the first leg extends perpendicular to the first L bracket stem; and a second L bracket coupled to the rear surface at the back plate second end.

5. The shopping cart bagging station of claim 4, wherein the second L bracket comprises:
a second L bracket stem having a second L bracket longitudinal axis, wherein the second L bracket stem is coupled to the back plate second end, and wherein the second L bracket longitudinal axis is perpendicular to the back plate longitudinal axis; and
a second leg coupled to the second L bracket stem, wherein the second leg extends perpendicular to the second L bracket stem.

6. The shopping cart bagging station of claim 5, wherein the first leg and the second leg each extend in a direction towards the front surface.

7. The shopping cart bagging station of claim 4, wherein the second L bracket comprises:
a second L bracket stem having a second stem first end and a second stem second end opposing the second stem first end;
a second L bracket longitudinal axis extending longitudinally from the second stem first end to the second stem second end; and
a second leg coupled to the second stem second end, wherein the second leg extends perpendicular to the second L bracket stem;
wherein the second L bracket is coupled to the rear surface at the back plate second end with the second leg extending in a direction towards the front surface.

8. A method of forming a shopping cart system, the method comprising:
providing a bag dispenser;
coupling a first L bracket and a second L bracket to a back plate to form a shopping cart coupler; and
coupling the back plate to the bag dispenser with a side of the shopping cart held between the bag dispenser and the back plate.

9. The method of claim 8, wherein the back plate is an elongate rigid bar having a back plate first end, a back plate second end opposing the back plate first end, a front surface, a rear surface, and a back plate longitudinal axis, wherein the back plate longitudinal axis extends longitudinally from the back plate first end to the back plate second end.

10. The method of claim 9, wherein the coupling the first and the second L bracket to the back plate to form the shopping cart coupler comprises:

coupling the first L bracket to the rear surface at the back plate first end; and
coupling the second L bracket to the rear surface at the back plate second end.

11. The method of claim 10, wherein the first L bracket comprises:
a first stem with a first stem first end and a first stem second end opposing the first stem first end;
a first L bracket longitudinal axis, wherein the first L bracket longitudinal axis extends longitudinally from the first stem first end to the first stem second end; and
a first leg coupled to the first stem, wherein the first leg extends perpendicular to the first stem;
wherein the coupling the first L bracket to the rear surface at the back plate first end comprises coupling the first stem to the rear surface, wherein the first leg extends in a direction towards the front surface.

12. The method of claim 11, wherein the coupling the first L bracket to the rear surface at the back plate first end further comprises coupling the first stem to the rear surface wherein the first L bracket longitudinal axis is perpendicular to the back plate longitudinal axis.

13. The method of claim 11, wherein the second L bracket comprises:
a second stem with a second stem first end and a second stem second end opposing the second stem first end;
a second L bracket longitudinal axis, wherein the second L bracket longitudinal axis extends longitudinally from the second stem first end to the second stem second end; and
a second leg coupled to the second stem, wherein the second leg extends perpendicular to the second stem;
wherein the coupling the second L bracket to the rear surface at the back plate second end comprises coupling the second stem to the rear surface, wherein the second leg extends in a direction towards the front surface.

14. The method of claim 13, wherein the coupling the second L bracket to the rear surface at the back plate second end further comprises coupling the second stem to the rear surface, wherein the second L bracket longitudinal axis is perpendicular to the back plate longitudinal axis.

15. The method of claim 13, wherein the first leg and the second leg hang from a rod of the shopping cart after fixedly mounting the bag dispenser to the back plate with the side of the shopping cart held between the bag dispenser and the back plate.

* * * * *